Aug. 13, 1946.  W. R. P. DELANO  2,405,877
APPARATUS FOR SOLAR DISTILLATION
Filed Oct. 6, 1943
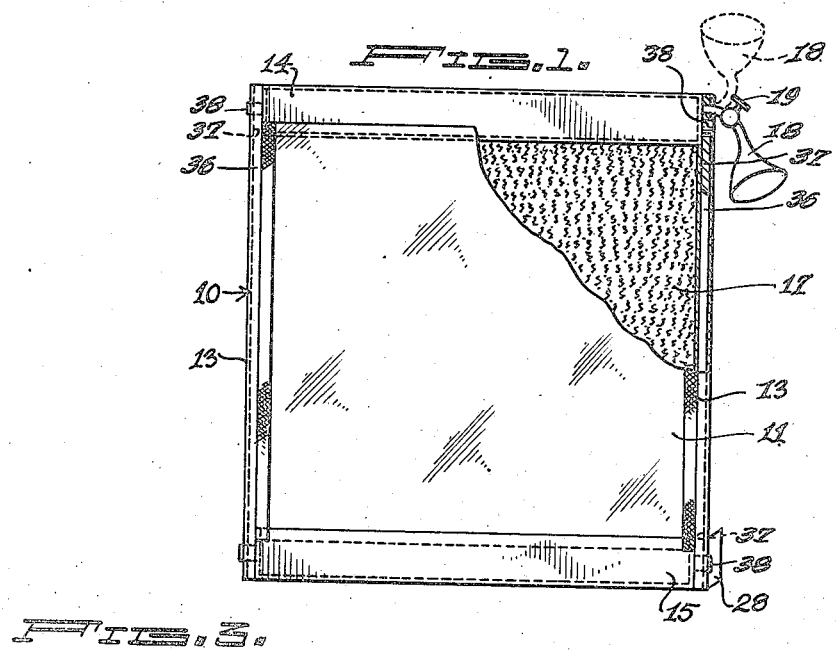
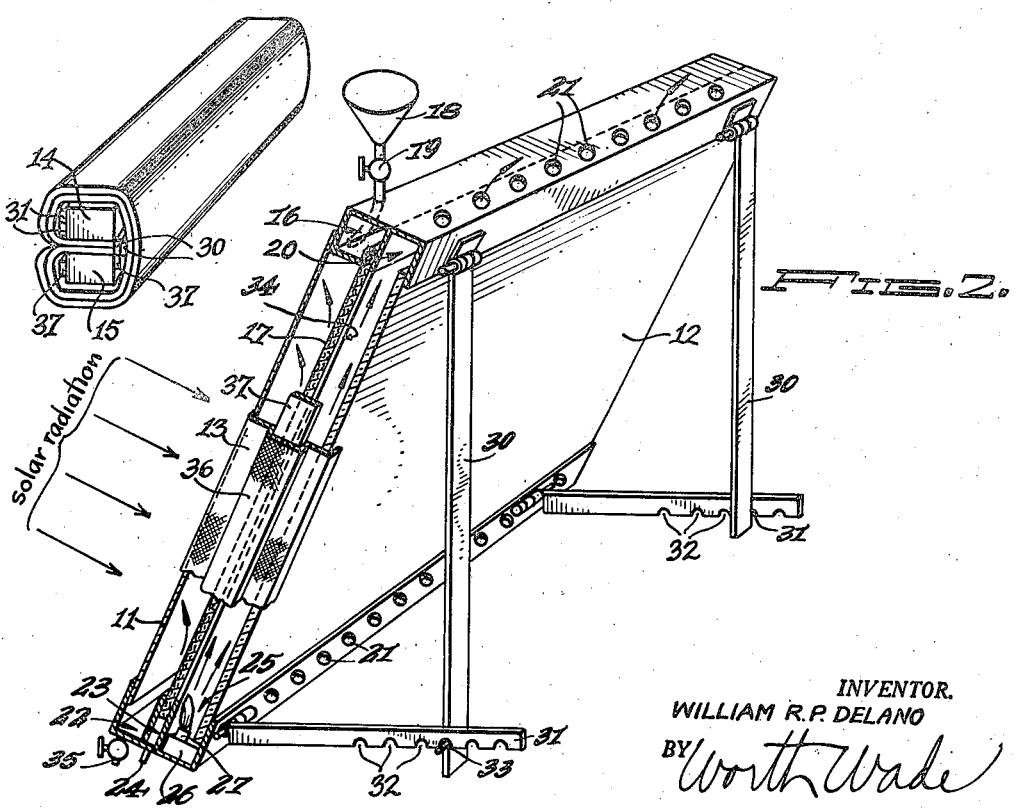
INVENTOR.
WILLIAM R. P. DELANO
BY Worth Wade
ATTORNEY.

Patented Aug. 13, 1946

2,405,877

UNITED STATES PATENT OFFICE 2,405,877

APPARATUS FOR SOLAR DISTILLATION

William R. P. Delano, Syosset, N. Y., assignor to Gallowhur Chemical Corporation, New York, N. Y., a corporation of Vermont Application October 6, 1943, Serial No. 505,151

5 Claims. (Cl. 202—234)

This invention relates in general to distillation and in particular to an apparatus and process for distilling liquids, in particular sea water, and to correlated improvements designed to render such an apparatus collapsible and portable.

The need of a simple and convenient method of distilling impure water, such as sea water, for the production of fresh water for drinking and the like has long been recognized, but this need becomes increasingly important during times of war when the destruction of ships and airplanes at sea forces the crews to take to lifeboats, rafts and floats. Accordingly, any apparatus and process for distilling sea water to produce fresh water for drinking on lifesaving craft must meet, inter alia, the following stringent requirements:

1. The device must have a relatively low weight per unit of capacity.
2. The device must be compact and occupy a small space when not in use.
3. The device must be resistant to corrosion by sun, air, water and the action of the salts contained in sea water.
4. The device should be easy to erect and simple to operate.
5. The apparatus should be capable of being fabricated without the use of critical or scarce war material.
6. The device should operate upon a source of cheap, plentiful fuel.
7. The fresh water produced should be free of salts, of harmful bacteria and should be substantially odorless and tasteless.

Accordingly, it is the general object of the present invention to provide an apparatus and process for the distillation of liquids, in particular, sea water, which will satisfy the objects above described and meet the specifications recited.

It is a further object of the invention to provide a simple means for distilling sea water which is adapted for use on small lifesaving craft.

It is a further object to provide an apparatus for distilling sea water which will be collapsible, compact and light in weight, so that it can be carried in airplanes and installed as regular equipment in small lifesaving craft.

Other objects of the invention will in part be obvious and will in part appear hereinafter.

According to the present invention, there is provided an apparatus for distilling liquids, especially for distilling sea water for the production of fresh water, comprising, the combination of, a closed container, a layer of absorbent material spaced from the front and back walls of said container, a transparent window in the front wall of said container, an insulating layer comprising the back wall of said container, means to saturate the absorbent material with the liquid to be distilled, means to dispose the transparent window to solar radiation, and auxiliary heating means in said container arranged and positioned to heat said absorbent layer. It is thus seen that the apparatus of the present invention comprises the essential features of the radiation distillation apparatus of my parent application Serial No. 465,366 filed November 12, 1942, in combination with auxiliary heating means.

It is to be understood that the apparatus of the present invention may be rigid or collapsible and foldable as will be hereinafter described in detail.

The process of the invention comprises incorporating the liquid to be distilled in a layer of absorbent material, exposing one surface of the layer to solar radiation and applying heat to the other side of such layer from another or auxiliary energy source.

For a more complete understanding of the nature and the objects of the invention, reference should be had to the accompanying drawing, in which:

Fig. 1 is a front elevation, partly in section, of one embodiment of the distillation apparatus of the invention;

Fig. 2 is a side elevation, partly in section, of the apparatus of Figure 1 taken along the line 2—2 thereof; and Fig. 3 is a view of the apparatus of Figs. 1 and 2 in a folded or collapsed condition.

In that embodiment shown in Figs. 1 and 2, the apparatus comprises a container designated generally by the numeral 10, having the front wall formed of a sheet 11 of transparent material and the back wall 12 formed of a layer of heat insulating material, and the side walls 13 formed of waterproof sheet material, and closed at the upper end by a rigid header 14 and closed at the lower end by a rigid base 15. The header is divided into two parts, one a longitudinal container 16 having a slot in the base thereof through which the upper end of the absorbent layer 17 extends. There may be provided a funnel or a secondary liquid reservoir 18 having a valve 19 and communicating with the container 16. The other compartment 20 of the header 14 is perforated at the top with a multiplicity of holes 21 to provide air vents. The longitudinal side walls of the header 14 are attached on one side to the upper end of the transparent sheet 11 and on the other side to the insulating sheet 12. The base is divided into three compartments, the front compartment 22 being a liquid reservoir communicating with the air space between the absorbent layer 17 and the transparent window 11. The longitudinal compartment 23 has a constriction at the top into which is fixed the lower end of the absorbent layer 17, one end of the compartment 23 being provided with a drainage tube 24 which extends through a wall of the container, such as the base as shown in the cross-section of Fig. 2. The third compartment 25 of the base is adapted and arranged to receive an auxiliary heating means, such, for example, as the solid alcohol container 26 provided with the wick 27. One end of the compartment 25 is provided with a door 28 through which the auxiliary heating means may be inserted and removed.

If the absorbent layer 17 is not sufficiently rigid to be self-supporting when the header 14 is stretched away from the base 15, the layer 17 may be supported upon a heat-conducting layer, such, for example, as a layer of sheet material, wire mesh, and the like.

To support the apparatus in a proper position with respect to the sun's rays, there may be provided a pair of rigid legs 30 which are hinged to the header 14 and extend downward at least to the bottom of the base 15 and a stretcher rod 31 hinged to the back of the base 15 and provided with a plurality of notches 32 which are adapted to engage one of the pins 33 which extend from the side of the leg 30 as shown in Fig. 2.

To operate the apparatus, the liquid to be distilled is fed by means of the funnel 18 and the valve 19 into the chamber 16 of the header 14 from which the liquid flows by capillary traction and saturates the layer 17 of absorbent material. The excess liquid may drain from the layer 17 into the lower chamber 23 from which it will flow through the outlet 24. The apparatus is then disposed so that the transparent window 11 is normal to the sun's rays. The rays passing through the transparent window will heat the layer 17 of transparent material causing the liquid therein to vaporize and condense upon the under surface of the window. The condensed liquid will run down the window and collect within the compartment 22 of the base 15 from which it may be drained through the faucet 35. If the heat of the sun's rays is not sufficient or the sun is not shining, one may use the auxiliary heating means 26 which is disposed in the compartment 25 by which the additional heat may be supplied to the absorbent layer 17. When the auxiliary heating means requires the use of an open flame, the absorbent layer 17 is protected by a backing of sheet material and the insulating layer 12 is made of asbestos. The hot gas rising in the space between the sheet 34 and the sheet 12 may be vented through the hole 21 in the header 14.

If desired, the apparatus may be made collapsible and foldable. When this is desired, the header and base may be made of rigid materials, but the transparent window 11, the absorbent layer 17, the insulating layer 12 and any supporting sheet 34 are made of flexible or foldable sheet materials. In this event, the leg 30 and the rods 31 are removably hinged to the header and base and these members are removed and placed lengthwise of the header, after which the apparatus may be rolled upon itself from the base upward or from the header downward, to give the collapsed device shown in Fig. 3.

When the device is made collapsible in the manner just described, the header 14 may be spaced from the base 15 by providing the side walls 13 with pockets or sleeves 36 through which may be passed slats 37 provided with holes at each end adapted to engage the rigid extension pins 38 extending from the ends of the header 14 and the ends of the base 15 as shown in Fig. 1. By suitably arranging the length of the slats 38, the several sheet materials, such as the window, the absorbent layer, and the insulating layer, may be rendered taut and spaced properly from each other.

It will be apparent from the above detailed description that the apparatus comprises three main elements and several optional but desirable elements. The essential elements are (1) the transparent window, (2) the absorbent material, (3) the shaping means, i. e. the means by which the article is given form and rigidity and proper disposition of the absorbent layer with respect to the window, and (4) the auxiliary heating means. Each of these elements will be described in detail hereinafter.

*The transparent window*

The sheet of transparent material shown in the apparatus of Fig. 1 should be a flexible but form-retaining sheet of any suitable transparent material, such, for example, as a cellulose ester, a cellulose ether, or a synthetic resin. Preferably, there is employed for this sheet material a transparent plastic which is permeable to visible and infra-red radiation such, for example, as cellulose acetate and cellulose aceto-butyrate. It is obvious that evaporation can take place from both the front and rear surfaces of the absorbent layer.

Since the transparent window divides the warm moist air of the interior from the cool dry air on the outside of the window, there will be normally a tendency of the window to become fogged by the condensation of droplets of water on the inner surface. Such droplets diffuse the light and decrease the radiation absorbed by the layer of absorbent material. Accordingly, it is desirable to retard or prevent fogging of the transparent window. This may be accomplished by forming the window of a transparent material combined on one or both sides with a layer of water-absorbent, that is hydrophilic material, which absorbs the condensed water and prevents it from remaining as individual droplets, as described in my co-pending U. S. applications Serial Nos. 500,882 filed September 2, 1943, and 501,219 filed September 4, 1943.

*The absorbent layer*

For the layer of absorbent material, there may be employed a layer of a viscose sponge, a pile fabric, a layer of inter-felted fibres such, for example, as textile felt or a soft, porous paper which has been sized with a water-insoluble substance such, for example, as casein, a resin or a cellulose ester which does not disintegrate when wet. Since the layer should be capable of being washed and wrung out, it is preferably formed of a material having a sufficient tensile strength for this purpose, that is, a textile fabric or felt, or sponge.

The absorbent layer is preferably colored black to render it more heat-absorbent and this may be done by dyeing or pigmenting the absorbent material with a suitable black dye or carbon black. To insure that the fresh water is free of harmful bacteria, the absorbent layer is advantageously rendered bacteriostatic or fungistatic and germicidal by combining it, e. g. by impregnation or coating, with a suitable water-insoluble germicide such, for example, as a phenyl mercury compound, finely divided ionized heavy metals, such as silver, copper or gold, or by means of an organic substantially water-insoluble germicide such, for example, as copper naphthenates, phenyl mercury chloride, phenyl mercury hydroxy quinoline, and dichlorodihydroxymethane.

*The auxiliary heating means*

For the auxiliary heating means there may be employed an electric heating element, steam, a heated fluid, such as hot water or hot oil, or preferably a liquid or solid fuel, such as an oil burner, candle, or solid alcohol. Without transcending the scope of the invention, the space between the absorbent layer and the insulating layer may be rendered liquid tight, and steam, hot water or hot oil may be continuously passed through such space.

All other sheet materials used in the apparatus may be formed of any flexible non-porous sheet material such, for example, as textile fabrics, felt or paper. Such materials should be stiffened and rendered waterproof by impregnating or coating them with a hydrophobic cellulose ester, cellulose ether, synthetic resin, rubber, and the like. In general, all such sheet materials should be water-impermeable.

Since most organic plastic materials contain residual volatile solvents or volatile plasticizers, they tend to undergo changes in dimension when subjected to such temperatures as are generated by the sun's rays. Therefore, in the now preferred embodiment, the sheet materials, before or after being incorporated in the device, are pre-heated to shrink them as described in my co-pending applications Ser. Nos. 500,882 filed September 2, 1943, and 501,219 filed September 4, 1943.

This application is a continuation-in-part of my co-pending application Serial No. 465,366 filed November 12, 1942.

The present apparatus represents an important improvement over the apparatus of my parent application in that liquid is distilled during the day by means of solar radiation and during periods of cloudy weather and at night, by means of the auxiliary heating source. It also has the advantage that when the energy from solar radiation is not sufficient or it is desired to speed up the rate of distillation, both solar radiation and heating from the auxiliary source may be simultaneously employed.

Having described my invention, what I claim as new and desire to secure by Letters Patent is:

1. In an apparatus for distilling liquids, the combination of, a layer of absorbent material, means for saturating the layer with the liquid to be distilled, a closed container formed of flexible material in which the absorbent layer is disposed, a transparent window in the container spaced from one face of said layer of absorbent material, means to dispose the transparent window normal to the sun's rays whereby said face of the absorbent layer is heated by solar radiation, a chamber located adjacent the opposite face of said layer of absorbent material and in heat transferring relation with respect thereto, and means for heating air in said chamber to promote distillation of liquid from said absorbent material.

2. An apparatus according to claim 1 in which there is provided a rigid base divided into three compartments extending for the length of the base, the front compartment being arranged and disposed to receive liquid draining from the undersurface of the transparent window, the middle compartment being adapted to receive liquid draining from the under edge of the absorbent layer, and the third compartment having an auxiliary source of heat therein.

3. An apparatus according to claim 1 in which the transparent window, the absorbent layer and the back wall of the container are made of flexible, foldable materials and the side walls of the container are provided with longitudinal pockets adapted to receive rigid slats for imparting rigidity to the container.

4. In apparatus for distilling liquids the combination of a layer of absorbent material, means for supplying liquid to be distilled to said layer, a container within which said layer of absorbent material is located, a transparent window in said container and spaced from one face of said layer of absorbent material, a sheet of heat conducting material in contact with the opposite face of said layer of absorbent material, means to dispose the transparent window normal to the sun's rays whereby said one face of the absorbent material is heated by solar radiation and auxiliary means for heating said heat conducting material.

5. In apparatus for distilling liquids the combination of a layer of absorbent material, means for supplying liquid to be distilled to said layer, a container within which said layer of absorbent material is located, a transparent window in said container and spaced from one face of said layer of absorbent material, a sheet of wire mesh screen in contact with the opposite face of said layer of absorbent material, means to dispose the transparent window normal to the sun's rays whereby said one face of the absorbent material is heated by solar radiation and auxiliary means for heating said wire mesh screen.

WILLIAM R. P. DELANO.